United States Patent Office 2,983,585
Patented May 9, 1961

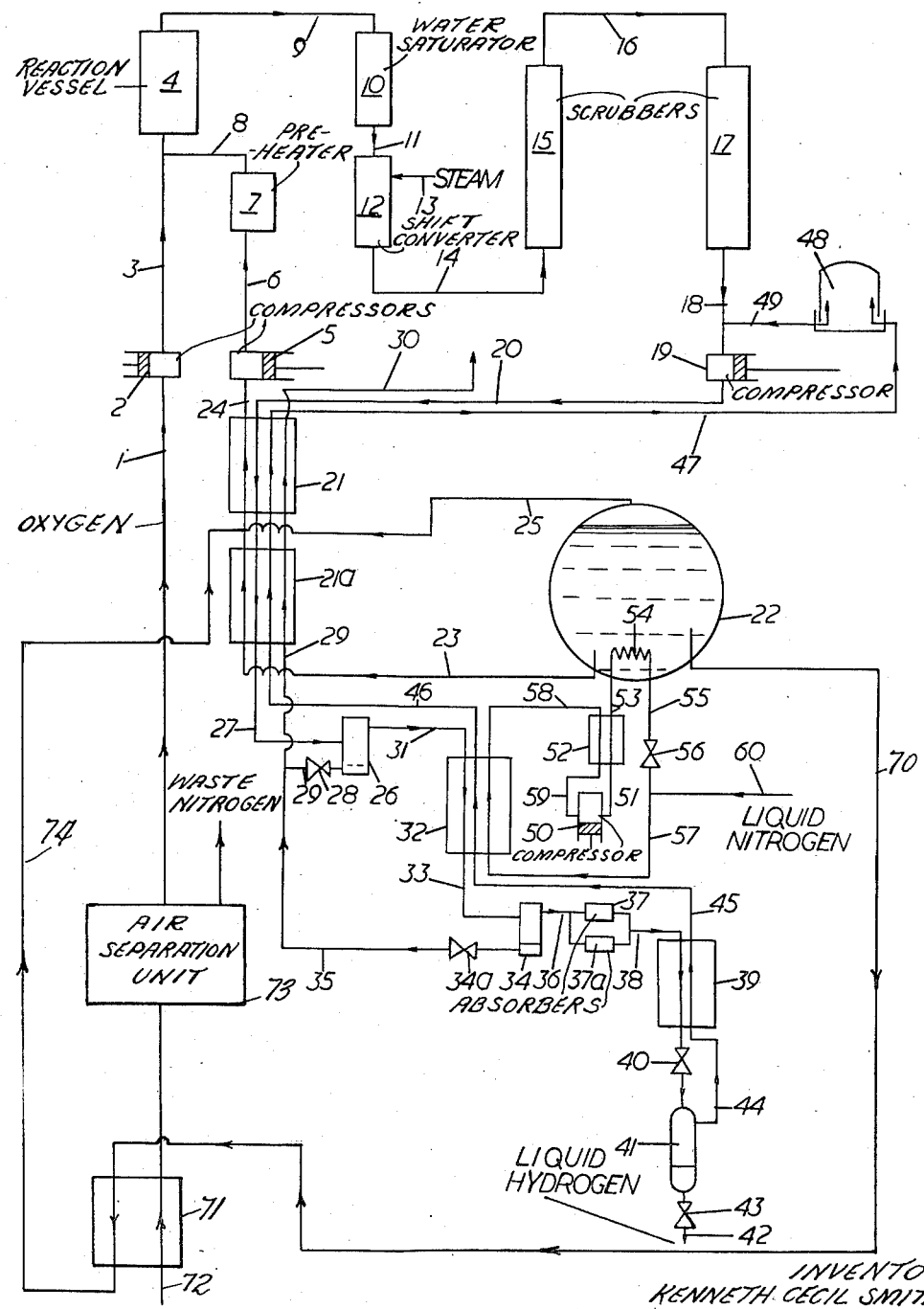

2,983,585

PREPARATION OF LIQUID HYDROGEN

Kenneth Cecil Smith, Poplar, England, assignor to The British Oxygen Company Limited, a British company Filed Dec. 4, 1958, Ser. No. 778,191

Claims priority, application Great Britain Dec. 11, 1957

2 Claims. (Cl. 23—213)

This invention relates to the preparation of liquid hydrogen from methane or a gas containing a high proportion of methane, such as, for example, natural gas.

It is known that hydrogen is produced by the pyrolysis or partial combustion of methane. The gaseous hydrogen so produced can be subsequently liquefied by processes involving refrigeration.

According to the present invention, a process for the production of liquid hydrogen comprises the steps of subjecting gaseous methane or a gas rich in methane to thermal decomposition to produce gaseous hydrogen, and thereafter liquefying the gaseous hydrogen so produced, at least a part of the cold required for such liquefaction being derived from the vaporisation of liquid methane or a liquefied gas rich in methane, the vaporised methane or gas rich in methane being used to provide at least a part of the feed to the thermal decomposition step.

The thermal decomposition of the gaseous methane or gas rich in methane to produce hydrogen may be carried out in any of several known ways. For example, the feed gas may be subjected to pyrolysis. This reaction proceeds in the absence of catalysts to give as the main products hydrogen and carbon black in addition to 5% residual methane, 1–2% of heavy hydrocarbons and small quantities of carbon monoxide and carbon dioxide.

Alternatively, the methane or gas containing methane may be reacted with steam at 700–800° C. in the presence of a suitable catalyst to give a product consisting principally of hydrogen and carbon monoxide. This product may if desired be reacted with further quantities of steam to convert the carbon monoxide to carbon dioxide with the formation of more hydrogen according to the formula:

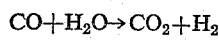

$$CO + H_2O \rightarrow CO_2 + H_2$$

For example, in Industrial & Engineering Chemistry, vol. 30, page 1139, a description of this process as applied to natural gas is given. A natural gas of composition approximately 90% methane, 8% ethane, 1.5 nitrogen and traces of other gases was reacted with an equal volume of steam by passage of the mixture through alloy steel tubes filled with catalyst at a temperature of 870° C. and gave a cracked gas having the approximate composition 75% hydrogen, 21% carbon monoxide, 1% carbon dioxide and 1% methane. This gas was mixed with a further 5 parts by volume of steam and maintained at 300–350° C. in order to promote the water-gas shift reaction with conversion of carbon monoxide to carbon dioxide. The product from this reaction contained roughly 80% hydrogen and 20% carbon dioxide, with small amounts of other gases. After removal of carbon dioxide by scrubbing with an amine mixture, the final gas mixture contained 96% hydrogen, 0.2% carbon dioxide, 0.5% carbon monoxide, 0.2% oxygen, 1.2% methane and 1.9% nitrogen.

As another alternative, the methane or gas rich in methane may be subjected to partial combustion with oxygen at a temperature of 800–900° C. in the presence of a nickel catalyst, to produce hydrogen and carbon monoxide according to the equation:

$$CH_4 + \tfrac{1}{2}O_2 \rightarrow 2H_2 + CO$$

As before the carbon monoxide may be converted to carbon dioxide by reaction with steam to produce further hydrogen.

The oxygen for the partial combustion process may conveniently be supplied by an air separation plant, the refrigeration for which is supplied by the vaporisation of liquid methane or a liquefied gas rich in methane, as described in our co-pending application No. 677,553. The methane or gas rich in methane so vaporised may also be used to provide a part of the feed to the thermal decomposition step, or it may be used for any other purpose, for example, the enrichment of towns gas.

It will be noted that in all the three alternative thermal decomposition treatments described above, the product gas contains considerable quantities of carbon dioxide and small quantities of other gases, which may include residual methane, carbon monoxide, oxygen and nitrogen. As described above, the carbon dioxide may readily be removed by scrubbing with a suitable absorbent liquid, for example, water, an amine or amine mixture in solution in water, or caustic alkali. If desired, two or more such liquids may be used in sequence.

The remaining gaseous impurities may be removed by any suitable method, but in accordance with a further feature of the present invention, these impurities are removed at least in part by fractional liquefaction, the cold required being derived from the vaporisation of liquid methane or a liquefied gas rich in methane. The methane or gas rich in methane so vaporised may again be used to supply a part of the feed to the thermal decomposition step, or for any other purpose.

The hydrogen-containing product gas from the thermal decomposition step, after removal of carbon dioxide, is preferably cooled both to effect liquefaction of the condensible impurities and to assist in the subsequent liquefaction of the hydrogen, at least in part by heat exchange with an external refrigerant which is itself cooled in vaporising liquid methane or a liquefied gas rich in methane. The hydrogen-containing product gas may also be cooled by heat exchange with the cold vaporised methane or gas rich in methane, before the latter is fed to the thermal decomposition step.

A convenient external refrigerant is liquid nitrogen, which where the thermal decomposition step involves partial combustion with oxygen, may be derived from the air separation unit which provides the oxygen.

The invention will now be more particularly described with reference to the accompanying drawing which illustrates diagrammatically one method of carrying out the invention. In this embodiment, liquid methane is used as the source of cold for liquefying the hydrogen but it will be appreciated that liquefied natural gas or other liquefied gas rich in methane may be used without any substantial modification of the process or apparatus. It will further be appreciated that this method of carrying out the process of the invention is described solely as an example and that other arrangements which will be apparent to those skilled in the art may be used.

Referring to the drawing, oxygen of purity 95 to 100% is supplied from an air separation unit as hereinafter described through a pipe 1 to a compressor 2, wherein it is compressed to a pressure between 10 and 20 atm. and thence through pipe 3 to a reaction vessel 4. Gaseous methane, produced as hereinafter described, is compressed to the same pressure in a compressor 5 and fed through a pipe 6 to a preheater 7, wherein it is preheated, and thence through pipe 8 to join the oxygen stream in the reaction vessel 4.

In the reaction vessel 4, partial combustion of the methane is effected on a nickel catalyst at a temperature of 800–900° C. according to the formula:

$$CH_4 + \tfrac{1}{2}O_2 \rightarrow 2H_2 + CO$$

The gaseous reaction product leaves the reaction vessel 4 through pipe 9 and is saturated with water in a vessel 10 from which it passes through pipe 11 to a shift converter 12 where the carbon monoxide is converted to carbon dioxide with the simultaneous formation of hydrogen by reaction with steam entering the converter 12 through pipe 13 according to the equation:

$$CO + H_2O \rightarrow CO_2 + H_2$$

Instead of being carried out at a pressure of 10–20 atm. as described above, these reactions, that is the partial combustion of methane and the reaction between the products of combustion and steam, may be effected at atmospheric pressure. In this case, however, it will be necessary to compress the gas leaving the shift converter 12 to a pressure of 10–20 atm.

The exit gas from the shift converter 12, which still contains some carbon monoxide, nitrogen and about 3–5% of unconverted methane besides carbon dioxide, passes through pipe 14 to a scrubber 15 wherein the major part of the carbon dioxide present is removed by scrubbing with a suitable absorbent liquid, such as water or a solution of monoethanolamine in water. From the scrubber 15, the gas passes through pipe 16 to a second scrubber 17 where the remaining carbon dioxide is removed by scrubbing with caustic soda solution. The purified gas, which now consists of hydrogen contaminated with small quantities of carbon monoxide, nitrogen and methane, is then passed through pipe 18 to a compressor 19 wherein it is compressed to 150 atm. The compressed gas then passes through pipe 20 to a two-stage liquid methane vaporiser 21 and 21a wherein it is cooled to a temperature of −160° C. by heat exchange with a counter-current flow of liquid methane from a storage vessel 22. The liquid methane is fed from the storage vessel 22 to the second stage 21a of the vaporiser through pipe 23 and after passing through both stages of the vaporiser wherein it is itself vaporised and warmed, passes through pipe 24 to the compressor 5, and thence as described to the reaction vessel 4. Methane evaporated within the storage vessel 22, both by heat inleak and by heat exchange with an external refrigerant as hereinafter described, is withdrawn from the top of the vessel 22 and fed through pipe 25 to the liquid methane stream at a point between the two stages 21 and 21a of the vaporiser.

The crude hydrogen also passes in counter-current heat exchange with cold gaseous hydrogen and with liquefied gaseous impurities in the vaporiser 21, 21a, as hereinafter described.

The cooling of the crude hydrogen to 160° C. in the vaporiser 21, 21a causes partial liquefaction of methane, carbon monoxide and nitrogen, which are separated in a separator 26 to which the crude hydrogen leaving the vaporiser passes through pipe 27. The separated impurities are passed through an expansion valve 28 and pipe 29 to the vaporiser 21, 21a through which they pass in counter-current heat exchange with the crude hydrogen, being themselves vaporised and discharged to waste through pipe 30.

From the separator 26, the crude hydrogen passes through pipe 31 to a heat exchanger 32 wherein it is cooled by counter-current heat exchange with cold low pressure hydrogen and cold nitrogen supplied from an independent refrigeration cycle as hereinafter described.

The crude hydrogen is cooled to about −208° C. in the heat exchanger 32 with a further condensation of part of the remaining gaseous impurities, and is passed through pipe 33 to a second separator 34 wherein condensed impurities are removed. These condensed impurities are fed through an expansion valve 34a and pipe 35 to join the condensed impurities leaving the separator 26 through pipe 28.

The crude hydrogen is passed from the separator 34 through pipe 36 to two low temperature absorbers 37 and 37a in parallel where the hydrogen is finally purified from the last traces of methane, carbon monoxide and nitrogen by charcoal or other suitable sorbent.

The purified high pressure hydrogen is passed from the absorbers 37 and 37a through pipe 30 to a heat exchanger 39 where it is further cooled by heat exchange with low pressure gaseous hydrogen, liquefied by expansion to atmospheric pressure through an expansion valve 40 and collected in a vessel 41 from which liquid hydrogen is drawn off as required through pipe 42 controlled by a valve 43.

The low pressure boil-off of hydrogen from the vessel 41 passes through pipe 44 to the heat exchanger 39 where it passes in counter-current heat exchange with the high pressure hydrogen as described above. From the exchanger 39 the gaseous hydrogen is passed through pipe 45 to the exchanger 32 and thence through pipe 46 to the vaporiser 21, 21a. From the vaporiser it passes through pipe 47 to a gas holder 48, which acts as a compensating vessel and can return hydrogen to the cycle through pipe 49 which joins pipe 18 upstream of the compressor 19.

The external refrigerating cycle which is used to cool the crude hydrogen in heat exchanger 32 as hereinbefore described, uses nitrogen as refrigerant in a closed cycle. The nitrogen is compressed to a pressure of 21 atmospheres by a vacuum pump/compressor unit 50 and passed through a pipe 51 to a heat exchanger 52 where it is cooled by counter-current heat exchange with cold nitrogen at sub-atmospheric pressure. From the exchanger 52, the cold compressed nitrogen is passed through a pipe 53 to a heat exchange coil 54 immersed in the liquid methane in the storage vessel 22. In the coil 54, the nitrogen is liquefied in evaporating liquid methane. From the coil 54, the liquefied nitrogen passes through pipe 55 to an expansion valve 56 where it is expanded to a sub-atmospheric pressure of about 10 cm. mercury and from which it passes through pipe 57 to heat exchanger 32 where it passes in counter-current heat exchange with crude hydrogen as hereinbefore described, and from which it passes through pipe 58 to the heat exchanger 52 where it passes in counter-current heat exchange with compressed nitrogen as described above. The nitrogen then passes through pipe 59 to the compressor/vacuum pump unit 50. The amount of nitrogen in the refrigeration cycle may be made up as necessary by feeding liquid nitrogen to the pipe 57 through a branch pipe 60. It will be appreciated that as an alternative to the coil 54 in the liquid methane storage vessel 22 the compressed nitrogen leaving heat exchanger 52 can be liquefied in a separate heat exchanger or condenser fed with liquid methane withdrawn from storage vessel 22.

Instead of passing to the gas-holder 48, the pure low pressure hydrogen leaving the vaporiser 21 may, if desired, be recompressed and stored in cylinders.

A further stream of liquid methane is withdrawn from the storage vessel 22 through line 70 and passed through a heat exchanger 71 where it serves to partially liquefy cooled compressed air flowing through a line 72 to an air separation unit 73 and is itself vaporised. The vaporised methane is fed through a pipe 74 to the methane stream in pipe 23 at a point between the two stages of the vaporiser 21 and 21a. The partially liquefied compressed air is separated in the unit 73 into a gaseous oxygen fraction of purity 95 to 100% which is fed through pipe 1 to the methane combustion step as hereinbefore described, and a waste nitrogen fraction.

I claim:

1. The process for the production of liquid hydrogen which comprises the steps of subjecting gaseous methane to partial combustion with oxygen to produce a gaseous product consisting principally of carbon monoxide and hydrogen, reacting said gaseous product with steam to convert the carbon monoxide present therein to carbon dioxide and hydrogen, removing carbon dioxide from said treated product, thereby leaving gaseous hydrogen containing minor amounts of impurities, compressing said impure gaseous hydrogen to a relatively high pressure, cooling said compressed impure gaseous hydrogen by heat exchange with a stream of liquid methane, whereby said liquid methane is vaporised, using said vaporised methane to provide a part of the gaseous methane feed to said partial combustion step, removing from said cooled compressed impure gaseous hydrogen impurities condensed in said cooling step, further cooling said compressed impure gaseous hydrogen by indirect heat exchange through the medium of an inert heat transfer medium with a stored body of liquid methane whereby a portion of said liquid methane is vaporised, using the vaporised methane so produced to provide a further part of the gaseous methane feed to said partial combustion step, removing impurities condensed in said further cooling step, removing residual impurities from said compressed cooled gaseous hydrogen by absorption, passing said pure compressed cooled gaseous hydrogen in heat exchange with returning expanded gaseous hydrogen, expanding said cooled compressed gaseous hydrogen to substantially atmospheric pressure, whereby a part thereof is liquefied, and using said residual expanded gaseous hydrogen in said heat exchange with said pure compressed gaseous hydrogen.

2. Process according to claim 1 including the steps of passing a second stream of liquid methane in heat exchange relationship with a stream of cooled compressed air, whereby said second stream of liquid methane is vaporised to provide a second stream of gaseous methane and said air stream is partially liquefied, using said second stream of gaseous methane to provide another part of the gaseous methane feed to the partial combustion step, separating from said partially liquefied air stream a gaseous oxygen fraction, and using said gaseous oxygen fraction to provide the oxygen feed to the partial combustion step.

References Cited in the file of this patent

UNITED STATES PATENTS

| | | |
|---|---|---|
| 1,913,805 | Hausen | June 13, 1933 |
| 2,279,097 | Stark | Apr. 7, 1942 |
| 2,495,549 | Roberts | Jan. 24, 1950 |
| 2,556,850 | Ogorzaly | June 12, 1951 |
| 2,799,997 | Morrison | July 23, 1957 |
| 2,823,523 | Eakin et al. | Feb. 18, 1958 |
| 2,922,286 | Rae | Jan. 26, 1960 |

OTHER REFERENCES

Industrial and Engineering Chemistry, published by The American Chemical Society, Easton, Pennsylvania, volume No. 30, number 10, October 1938, pages 1140–1145.

Taylor: Industrial Hydrogen, published by The Chemical Catalog Company, Incorporated, New York, New York, copyright 1921, page 147.